United States Patent
Aoki et al.

(10) Patent No.: US 10,483,571 B2
(45) Date of Patent: Nov. 19, 2019

(54) FUEL CELL SYSTEM

(71) Applicant: KABUSHIKI KAISHA TOYOTA CHUO KENKYUSHO, Nagakute-shi, Aichi-ken (JP)

(72) Inventors: Masakazu Aoki, Nagakute (JP); Takafumi Yamauchi, Nagakute (JP); Yasuki Hirota, Nagakute (JP); Ryuichi Iwata, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 17 days.

(21) Appl. No.: 15/640,947

(22) Filed: Jul. 3, 2017

(65) Prior Publication Data

US 2018/0019488 A1   Jan. 18, 2018

(30) Foreign Application Priority Data

Jul. 15, 2016   (JP) .................................. 2016-140864

(51) Int. Cl.
*H01M 8/04029* (2016.01)
*H01M 8/04746* (2016.01)
(Continued)

(52) U.S. Cl.
CPC ... *H01M 8/04753* (2013.01); *H01M 8/04029* (2013.01); *H01M 8/04089* (2013.01);
(Continued)

(58) Field of Classification Search
CPC .............. H01M 8/04; H01M 8/04753; H01M 8/04029; H01M 8/04089; H01M 8/04201;
(Continued)

(56) References Cited

U.S. PATENT DOCUMENTS

| | | | | |
|---|---|---|---|---|
| 2003/0170518 | A1* | 9/2003 | Clawson | ........... H01M 8/04022 429/423 |
| 2004/0247959 | A1* | 12/2004 | Kimbara | ............. B60L 11/1883 429/437 |
| 2008/0044704 | A1* | 2/2008 | Kubo | ................ H01M 8/04007 429/434 |

FOREIGN PATENT DOCUMENTS

| | | |
|---|---|---|
| JP | 2004-022364 A | 1/2004 |
| JP | 2004-171973 A | 6/2004 |

(Continued)

OTHER PUBLICATIONS

Linder et al., "An energy-efficient air-conditioning system for hydrogen driven cars," International Journal of Hydrogen Energy, pp. 3215-3221, 2011.

(Continued)

*Primary Examiner* — James Lee
(74) *Attorney, Agent, or Firm* — Oliff PLC

(57) ABSTRACT

A fuel cell system includes: a plurality of reactor vessels containing a hydrogen storage material; a hydrogen tank storing a hydrogen gas; a fuel cell; a cooling device to dissipate exhaust heat from the reactor vessels or the fuel cell to the outside; a hydrogen gas line that can switch supply routes of the hydrogen gas among the reactor vessels, the hydrogen tank, and the fuel cell; a heat exchange line that can switch circulation routes of a heat exchange medium among the reactor vessels, the fuel cell, and the cooling device; and a control mechanism to switch the supply routes of the hydrogen gas and the circulation routes of the heat exchange medium.

8 Claims, 5 Drawing Sheets

(51) Int. Cl.
*H01M 8/04082* (2016.01)
*H01M 8/0432* (2016.01)
*H01M 8/04089* (2016.01)
*H01M 8/1018* (2016.01)
*H01M 8/04291* (2016.01)

(52) U.S. Cl.
CPC ... *H01M 8/04201* (2013.01); *H01M 8/04216* (2013.01); *H01M 8/04328* (2013.01); *H01M 8/04365* (2013.01); *H01M 8/04373* (2013.01); *H01M 8/04291* (2013.01); *H01M 2008/1095* (2013.01)

(58) Field of Classification Search
CPC ......... H01M 8/04328; H01M 8/04365; H01M 8/04373
See application file for complete search history.

(56) References Cited

FOREIGN PATENT DOCUMENTS

| | | |
|---|---|---|
| JP | 2004-247164 A | 9/2004 |
| JP | 2004-259472 A | 9/2004 |
| JP | 2004-281243 A | 10/2004 |
| JP | 2006-512738 A | 4/2006 |
| JP | 2006-228629 A | 8/2006 |
| WO | 2004/062001 A2 | 7/2004 |

OTHER PUBLICATIONS

Jul. 24, 2018 Office Action issued in Japanese Patent Application No. 2016-140864.

* cited by examiner

FUEL CELL SYSTEM

The present invention relates to a fuel cell system, and more specifically to a fuel cell system including both a hydrogen tank storing a hydrogen gas and a reactor vessel containing a hydrogen storage material, which act as fuel sources.

BACKGROUND OF THE INVENTION

In a fuel cell system using hydrogen as a fuel gas, a hydrogen gas tank, a liquid hydrogen tank, a tank filled with a hydrogen storage material, or the like is used as a hydrogen source. In those tanks, a tank filled with a hydrogen storage material has a high hydrogen storage density per unit volume and hence can contribute to the downsizing of a system. Consequently, a fuel cell system using the tank is appropriate in particular as an energy source of a movable body.

Since a fuel cell has an appropriate operating temperature range, the temperature of the fuel cell has to be maintained in an appropriate temperature range in order to obtain high power generation efficiency. Further, since a hydrogen storage material generates heat when a hydrogen gas is absorbed and absorbs heat when a hydrogen gas is desorbed, the heat management of the hydrogen storage material is required in order to absorb and desorb hydrogen on a timely basis.

Now, various proposals have heretofore been given in order to solve the problems.

Patent Literature 1, for example, discloses a fuel cell system of, when the fuel cell system starts,
(a) supplying electric power to a drive motor in the state of fixing a vehicle drive output shaft of the drive motor, discharging the electric power consumed by the drive motor as heat, and raising the cooling water temperature of a fuel cell by using the heat, and at the same time
(b) making a fuel cell stack generate electricity at an output power lower than electric power that can be generated, making the fuel cell stack itself generate heat, and thus warming up the fuel cell stack from the interior.

The literature describes that the warm-up of a fuel cell stack can be accelerated by such a method without increasing an energy loss.

Further, Patent Literature 2 discloses a cooling system controller of, when a coolant of a fuel cell and another heat dissipation unit are cooled simultaneously by using a radiator fan, splitting the coolant of the fuel cell in a radiator direction and in a radiator by-pass direction at predetermined ratios.

The literature describes that the temperature of the coolant of a fuel cell can be restrained from being lowered excessively by feeding the coolant of the fuel cell more in the radiator by-pass direction when another heat dissipation unit is mainly cooled by using a radiator fan.

Furthermore, Patent Literature 3 discloses a cooling controller for a fuel cell of, when a coolant is circulated between a fuel cell and a radiator and the radiator is cooled with a fan,
(a) setting a restricted rotation number for the rotation number of line fan,
(b) making the restricted rotation number variable in response to the usage environment of the fuel cell, and
(c) changing the restricted rotation number in the manner of delaying from the variation of the usage environment when the usage environment of the fuel cell varies and the restricted rotation number is required to change.

The literature describes that the requirements of both cooling performance and sound vibration performance can withstand by such a method.

In addition, Non-patent Literature 1 proposes a system of installing two reactor vessels containing a hydrogen storage alloy between a hydrogen tank and a fuel cell, and using heat generation and heat absorption accompanying the absorption and desorption of hydrogen in the hydrogen storage alloy for air conditioning.

The temperature management of a fuel cell is generally carried out with a radiator. In the case of circulating a coolant between a fuel cell and a radiator, a temperature difference $\Delta T$ between the temperature of the heat exchange part of the radiator and an ambient temperature is low when the exhaust heat temperature of the fuel cell is relatively low. On this occasion, a large-sized radiator is required in order to dissipate the heat from the fuel cell efficiently. When a large-sized radiator is used, however, the degree of freedom in the shape of a fuel cell system lowers.

Meanwhile, Non-patent Literature 1 discloses a system of using heat generation and heat absorption accompanying the absorption and desorption of hydrogen in a hydrogen storage alloy for air conditioning. For example, when cooling is required in air conditioning, however, hydrogen can be desorbed from a hydrogen storage alloy by using the heat of the air conditioning, but the heat generation during hydrogen absorption cannot be used for the air conditioning. When heating is required in air conditioning in contrast, the heat generation during hydrogen absorption can be used for air conditioning, but another heat source is required when hydrogen is desorbed from a hydrogen storage alloy. Consequently, the effective utilization of heat is insufficient merely by a system of thermally connecting a hydrogen storage alloy and air conditioning.

CITATION LIST

Patent Literature

[Patent Literature 1] Japanese Unexamined Patent Application Publication No. 2004-247164
[Patent Literature 2] Japanese Unexamined Patent Application Publication No. 2004-259472
[Patent Literature 3] Japanese Unexamined Patent Application Publication No. 2006-228629

Non-patent Literature

[Non-patent Literature 1] Int. J. Hydrogen Energy 36 (2011) 3215-3221

SUMMARY OF THE INVENTION

A problem to be solved by the present invention is to make it possible to maintain the temperature of a fuel cell at an appropriate temperature without using a large-sized cooling device in a fuel cell system using a hydrogen tank and a hydrogen storage material as hydrogen sources.

Further, another problem to be solved by the present invention is to make it possible to reversibly absorb and desorb hydrogen without using another heat source or another cooling source in a fuel cell system using a hydrogen tank and a hydrogen storage material as hydrogen sources.

A fuel cell system according to the present invention is configured as follows in order to solve the above problems.

(1) The fuel cell system includes:
a plurality of reactor vessels containing a hydrogen storage material;
a hydrogen tank storing a hydrogen gas;
a fuel cell;
a cooling device to dissipate exhaust heat from the reactor vessels or the fuel cell to the outside;
a hydrogen gas line that can switch the supply routes of the hydrogen gas among the reactor vessels, the hydrogen tank, and the fuel cell;
a heat exchange line that can switch circulation routes of a heat exchange medium among the reactor vessels, the fuel cell, and the cooling device; and
a control mechanism to switch the supply routes of the hydrogen gas and the circulation routes of the heat exchange medium.

(2) The hydrogen gas line includes:
a supply route (A) to supply the hydrogen gas from the hydrogen tank to at least one of the reactor vessels;
a supply route (B) to supply the hydrogen gas from at least one of the reactor vessels to the fuel cell; and
a supply route (C) to supply the hydrogen gas from the hydrogen tank to the fuel cell.

(3) The heat exchange line includes:
a circulation route (A) to circulate the heat exchange medium between at least one of the reactor vessels and the cooling device;
a circulation route (B) to circulate the heat exchange medium between at least one of the reactor vessels and the fuel cell; and
a circulation route (C) to circulate the heat exchange medium between the fuel cell and the cooling device.

A fuel cell system according to the present invention includes both a hydrogen tank storing a hydrogen gas and a plurality of reactor vessels containing a hydrogen storage material, which act as fuel sources. Consequently, at the time of start-up, the temperature of the fuel cell can be raised rapidly to appropriate temperature by supplying hydrogen from the hydrogen tank to the fuel cell.

Further, when the temperature of the fuel cell rises to a predetermined temperature, at least a reactor vessel (A) can be heated by using the exhaust heat from the fuel cell and hydrogen can be desorbed from the reactor vessel (A). The hydrogen desorbed from the reactor vessel (A) can be used directly as a fuel for the fuel cell.

At the same time, when at least another reactor vessel (B) is thermally connected to a cooling device and a hydrogen gas is supplied to the interior of the reactor vessel (B), the hydrogen can be absorbed in a hydrogen storage material in the interior of the reactor vessel (B) and simultaneously the absorption heat can be dissipated to the outside by using the cooling device.

Consequently, it is unnecessary to use a large-sized cooling device in order to maintain the temperature of the fuel cell at an appropriate temperature. Further, when a set of hydrogen desorption in the reactor vessel (A) and hydrogen absorption in the reactor vessel (B) and a set of hydrogen absorption in the reactor vessel (A) and hydrogen desorption in the reactor vessel (B) are repeated alternately, it is possible to absorb and desorb hydrogen reversibly without using another heat source and another cooling source.

DETAILED DESCRIPTION OF THE PREFERRED EMBODIMENTS

An embodiment according to the present invention is hereunder explained in detail.

[1. Fuel Cell System]

Figure 1:
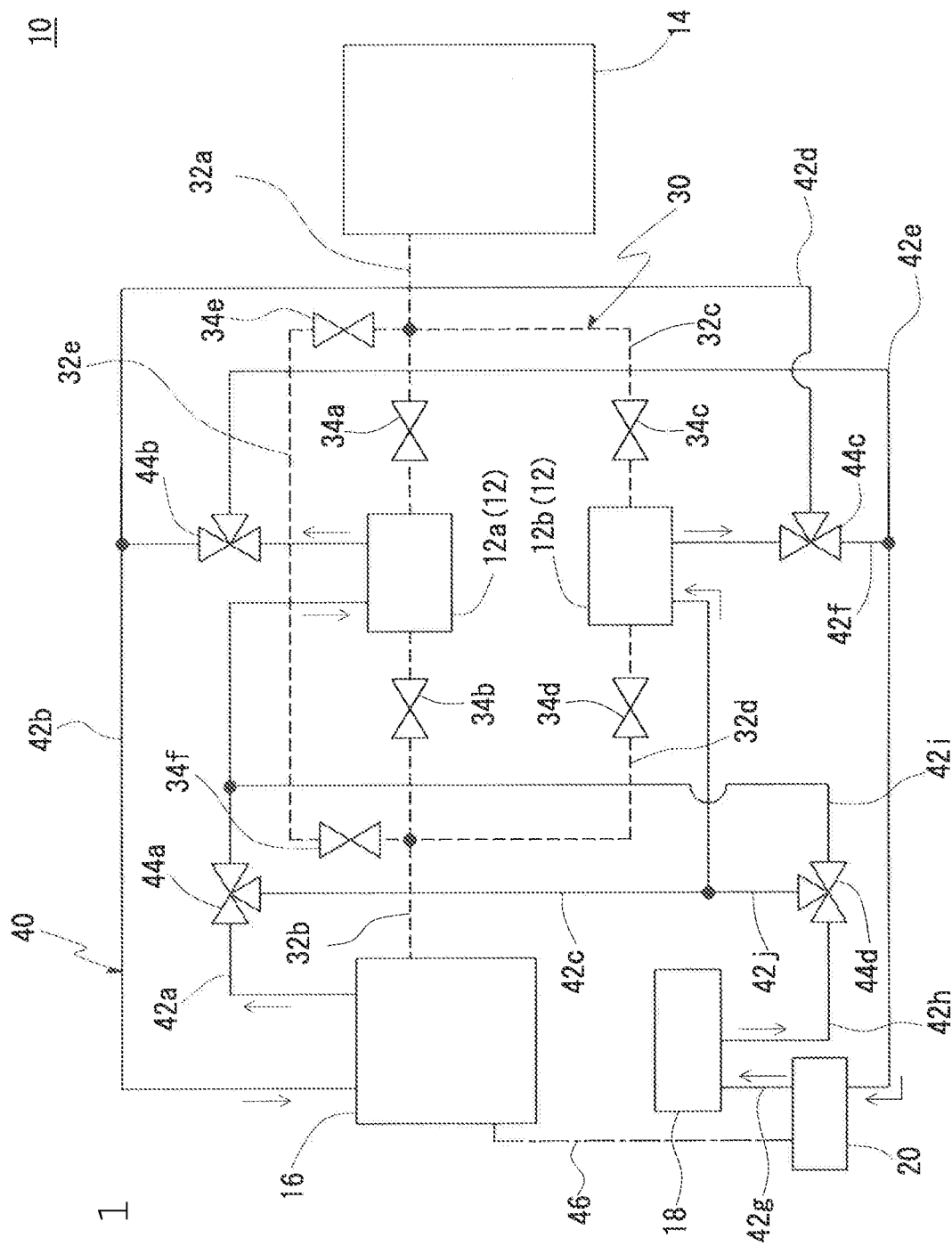
FIG. 1 is a schematic diagram of a fuel cell system according to the present invention.

FIG. 1 shows a schematic diagram of a fuel cell system according to the present invention. In FIG. 1, a fuel cell system 10 includes:
a plurality of reactor vessels 12 containing at hydrogen storage material;
a hydrogen tank 14 storing a hydrogen gas;
a fuel cell 16;
a cooling device 18 to dissipate exhaust heat from the reactor vessels 12 or the fuel cell 16 to the outside;
a hydrogen gas line 30 that can switch supply routes of the hydrogen gas among the reactor vessels 12, the hydrogen tank 14, and the fuel cell 16;
a heat exchange line 40 that can switch circulation routes of a heat exchange medium among the reactor vessels 12, the fuel cell 16, and the cooling device 18; and
a control mechanism (not shown in the figure) to switch the supply routes of the hydrogen gas and the circulation routes of the heat exchange medium.

The fuel cell system 10 may further include a boiler 20 and/or a temperature measurement unit (not shown in the figure).

[1.1. Reactor Vessel]
[1.1.1. Structure of Reactor Vessel]

A reactor vessel 12 contains a hydrogen storage material. The reactor vessel 12 includes a storage space of the hydrogen storage material and a heat exchanger (not shown in the figure) to exchange heat with a heat exchange medium. The structure of the reactor vessel 12 is not particularly limited as long as the reactor vessel 12 can absorb and desorb hydrogen and exchange heat with a heat exchange medium.

[1.1.2. Number of Reactor Vessels]

Although the fuel cell system 10 includes two reactor vessels 12 in total of a reactor vessel (A) 12a and a reactor vessel (B) 12b in FIG. 1, this is only an example. The number of the reactor vessels 12 is not particularly limited in the present invention.

Each of the reactor vessels 12 takes any one of
(a) a state of desorbing hydrogen from a hydrogen storage material by using exhaust heat from a fuel cell 16 and supplying the desorbed hydrogen to the fuel cell 16 (hereunder referred to merely as "desorption"),
(b) a state of absorbing a hydrogen gas supplied from a hydrogen tank 14 into a hydrogen storage material and dissipating the absorption heat to the outside with a cooling device 18 (hereunder referred to merely as "absorption"), and (c) a state of not absorbing or desorbing hydrogen into or from a hydrogen storage material and not exchanging heat with a fuel cell 16 or a cooling device 18 (hereunder referred to merely as "pause").

The state of each of the reactor vessels 12 is changed by switching a hydrogen gas line 30 and a heat exchange line 40 with a control mechanism.

In a fuel cell system 10 including two reactor vessels 12 (a reactor vessel (A) 12*a* and a reactor vessel (B) 12*b*) for (a) a state of desorption in the reactor vessel (A) 12*a* and absorption in the reactor vessel (B) 12*b* and (b) a state of absorption in the reactor vessel (A) 12*a* and desorption in the reactor vessel (B) 12*b* are repeated alternately.

In a fuel cell system 10 including three or more reactor vessels 12, the state of each of the third and subsequent reactor vessels 12 can be selected arbitrarily depending on the purpose.

For example, a hydrogen gas line 30 and a heat exchange line 40 may be controlled so that each of the reactor vessels 12 may repeat the states of desorption, absorption, and then pause periodically. Alternatively, by connecting two or more reactor vessels 12 to the hydrogen gas line 30 and the heat exchange line 40 in series or in parallel, a hydrogen gas line 30 and a heat exchange line 40 may be controlled so that the two or more reactor vessels 12 may simultaneously repeat the states of desorption and then absorption or the states of desorption, absorption, and then pause periodically. The details of the control, method of a hydrogen gas line 30 and a heat exchange line 40 will be described later.

[1.1.3. Hydrogen Storage Material]

A hydrogen storage material is contained in each of reactor vessels 12. In the present invention, the composition of a hydrogen storage material is not particularly limited. An identical kind of hydrogen storage material may be contained in the reactor vessels 12 or different kinds of hydrogen storage materials may be contained in respective reactor vessels 12. Further, the quantities of the hydrogen storage materials contained in the reactor vessels 12 may be either identical or different.

A maximum exhaust heat temperature ($T_{max}$) of a fuel cell 16 varies in accordance with the type. An equilibrium temperature of a hydrogen storage material when a hydrogen pressure is 0.1 MPa (hereunder referred to also as "a minimum equilibrium temperature ($T_L$)") may desirably be not higher than the maximum exhaust heat temperature ($T_{max}$) of a fuel cell 16 in order to desorb hydrogen by using only the exhaust heat of the fuel cell 16. A more desirable minimum equilibrium temperature ($T_L$) is not higher than $0.9 \times T_{max}$.

Meanwhile, when a minimum equilibrium temperature ($T_L$) is higher than room temperature and an external heat source for heating a reactor vessel 12 does not exist, hydrogen cannot be supplied from the reactor vessel 12 to a fuel cell 16 at the time of start-up. On this occasion, a hydrogen gas is supplied directly from a hydrogen tank 14 to the fuel cell 16 until the temperature of the fuel cell 16 exceeds ($T_L$).

Meanwhile, when a pressure more than necessary is required in order to realize a heat temperature exceeding the maximum exhaust heat temperature ($T_{max}$) of a fuel cell 16, a reactor vessel 12 may be damaged undesirably. Consequently, an equilibrium temperature of a hydrogen storage material when a hydrogen pressure is 10 MPa (hereunder referred to also as "a maximum equilibrium temperature ($T_H$)") may desirably be higher than the maximum exhaust heat temperature ($T_{max}$) of a fuel cell 16. A more desirable maximum equilibrium temperature ($T_H$) is not lower than $1.1 \times T_{max}$.

[1.2. Hydrogen Tank]

A hydrogen tank 14 stores a hydrogen gas. The structure, capacity, and the like of a hydrogen tank 14 are not particularly limited in the present invention. A hydrogen gas in a hydrogen tank 14 is supplied to a fuel cell 16 or a reactor vessel 12 on a case-by-case basis. This will be described later.

[1.3. Fuel Cell]

In the present invention, the type of a fuel cell 16 is not particularly limited. In particular, a solid polymer electrolyte fuel cell has a maximum exhaust heat temperature ($T_{max}$) lower and a temperature difference ΔT from the ambient temperature relatively smaller than another fuel cell. As a result, a relatively large cooling device 18 is required for efficient cooling. When the present invention is applied to a solid polymer electrolyte fuel cell in contrast with this, a cooling device 18 can be downsized.

[1.4. Cooling Device]

A cooling device 18 dissipates exhaust heat from a reactor vessel 12 or a fuel cell 16 to the outside. In the present invention, a cooling device 18 is connected to either a reactor vessel 12 or a fuel cell 16 which has the highest temperature through a heat exchange line 40 that, can switch the circulation routes of a heat exchange medium. As a result, the difference ΔT between the temperature of a heat source and the ambient temperature can be increased. As a result further, the cooling device 18 can be downsized in comparison with the case of merely circulating a heat exchange medium between a fuel cell 16 and a cooling device 18.

The composition of a heat exchange medium is not particularly limited.

[1.5. Boiler]

A boiler 20 stores produced water of a fuel cell 16 and boils the produced water by exchanging heat with a heat exchange medium. The boiled produced water is discharged as steam from the boiler 20. A boiler 20 is not absolutely necessary but a cooling device 18 can be downsized by installing a boiler 20 on a circulation route of a heat exchange medium.

The installation position of a boiler 20 is not particularly limited. For example, when the maximum equilibrium temperature ($T_H$) of a hydrogen storage material is higher than the maximum exhaust heat temperature ($T_{max}$) of a fuel cell 16, the temperature of a reactor vessel 12 while it absorbs hydrogen is generally higher than $T_{max}$. On such an occasion, a boiler 20 is preferably connected to a circulation route (A) to circulate a heat exchange medium between at least one reactor vessel 12 and a cooling device 18. A boiler 20 may be connected to a cooling device 18 either on the upstream side or on the downstream side in the flow of a heat exchange medium.

[1.6. Hydrogen Gas Line]

A hydrogen gas line 30 is configured so as to be able to switch the supply routes of a hydrogen gas among reactor vessels 12, a hydrogen tank 14, and a fuel cell 16. That is, a hydrogen gas line 30 includes:

a supply route (A) to supply a hydrogen gas from a hydrogen tank 14 to at least one of reactor vessels 12;

a supply route (B) to supply the hydrogen gas from at least one of the reactor vessels 12 to a fuel cell 16; and a supply route (C) to supply the hydrogen gas from the hydrogen tank 14 to the fuel cell 16.

The supply route (C) either may supply the hydrogen gas to the fuel cell 16 through at least one of the reactor vessels 12 or may supply the hydrogen gas to the fuel cell 16 without passing through the reactor vessels 12.

A hydrogen gas line 30 concretely includes:

(a) gas pipes to connect reactor vessels 12, a hydrogen tank 14, and a fuel cell 16 to each other and feed a hydrogen gas; and (b) three-way valves, on-off valves, and the like to switch the flow of the hydrogen gas. The arrangement of the gas pipes, the three-way valves, the on-off valves, and the like is not particularly limited as long as the above functions are exhibited.

In a fuel cell system 10 shown in FIG. 1, an outlet of a hydrogen tank 14 for a hydrogen gas is connected to an inlet of a reactor vessel (A) 12a for the hydrogen gas through a gas pipe 32a. An on-off valve 34a is installed in the middle of the gas pipe 32a. Further, an outlet of the reactor vessel (A) 12a for the hydrogen gas is connected to an inlet of an anode in a fuel cell 16 through, a gas pipe 32b. An on-off valve 34b is installed in the middle of the gas pipe 32b.

Further, the outlet of the hydrogen tank 14 for the hydrogen gas is connected to an inlet of a reactor vessel (B) 12b for the hydrogen gas through the gas pipe 32a and a gas pipe 32c. A base end of the gas pipe 32c is connected to the gas pipe 32a located between the hydrogen tank 14 and the on-off valve 34a. Further, an on-off valve 34c is installed in the middle of the gas pipe 32c.

An outlet of the reactor vessel (B) 12b for the hydrogen gas is connected to the anode in the fuel cell 16 through a gas pipe 32d and the gas pipe 32b. A terminal of the gas pipe 32d is connected to the gas pipe 32b located between the on-off valve 34b and the fuel cell 16. Further, an on-off valve 34d is installed in the middle of the gas pipe 32d.

Further, the outlet of the hydrogen tank 14 for the hydrogen gas is connected to the anode in the fuel cell 16 through the gas pipe 32a, a gas pipe 32e, and the gas pipe 32b. The gas pipe 32e is a by-pass pipe to detour the reactor vessel (A) 12a and the reactor vessel (B) 12b and supply the hydrogen gas directly from the hydrogen tank 14 to the fuel cell 16. A base end of the gas pipe 32e is connected to the gas pipe 32a located between the hydrogen tank 14 and the on-off valve 34a. Further, a terminal of the gas pipe 32e is connected to the gas pipe 32b located between the on-off valve 34b and the fuel cell 16. Moreover, an on-off valve 34e and an on-off valve 34f are installed on the base end side and the terminal side of the gas pipe 32e respectively.

For example, when the on-off valve 34a opens and the on-off valves 34b to 34f close, the hydrogen gas can be supplied from the hydrogen tank 14 to the reactor vessel (A) 12a through the gas pipe 32a. On this occasion, the gas pipe 32a constitutes the supply route (A).

Alternatively, when the on-off valve 34c opens and the on-off valves 34a, 34b, and 34d to 34f close, the hydrogen gas can be supplied from the hydrogen tank 14 to the reactor vessel (B) 12b through the gas pipes 32a and 32c. On this occasion, the gas pipes 32a and 32c constitute the supply route (A).

Further, when the on-off valve 34b opens and the on-off valves 34a and 34c to 34f close, the hydrogen gas can be supplied from the reactor vessel (A) 12a to the fuel cell 16 through the gas pipe 32b. On this occasion, the gas pipe 32b constitutes the supply route (B).

Alternatively, when the on-off valve 34d opens and the on-off valves 34a to 34c, 34e, and 34f close, the hydrogen gas can be supplied from the reactor vessel (B) 12b to the fuel cell 16 through the gas pipes 32d and 32b. On this occasion, the gas pipes 32d and 32b constitute the supply route (B).

Furthermore, when the on-off valves 34e and 34f open and the on-off valves 34a to 34d close, the hydrogen gas can be supplied from the hydrogen tank 14 to the fuel cell 16 through the gas pipes 32a, 32e, and 32b. On this occasion, the gas pipes 32a, 32e, and 32b constitute the supply route (C).

[1.7. Heat Exchange Line]

A heat exchange line 40 is configured so as to be able to switch the circulation routes of a heat exchange medium among reactor vessels 12, a fuel cell 16, and a cooling device 18. That is, a heat exchange line 40 includes:

a circulation route (A) to circulate a heat exchange medium between at least one of reactor vessels 12 and a cooling device 18;

a circulation route (B) to circulate the heat exchange medium between at least one of the reactor vessels 12 and a fuel cell 16; and a circulation route (C) to circulate the heat exchange medium between the fuel cell 16 and the cooling device 18.

Further, when a boiler 20 is provided, the heat exchange line 40 is further configured so as to be able to exchange heat among the reactor vessels 12, the fuel cell 16, the cooling device 18, and the boiler 20. As stated earlier, when a boiler 20 is provided, the boiler 20 is preferably connected to the circulation route (A).

A heat exchange line 40 concretely includes:

(a) liquid pipes to connect reactor vessels 12, a cooling device 18, and a fuel cell 16 (and a boiler 20) to each other and feed a heat exchange medium; and (b) three-way valves, on-off valves, and the like to switch the flow of the heat exchange medium. The arrangement of the liquid pipes, the three-way valves, the on-off valves, and the like is not particularly limited as long as the above functions are exhibited.

In a fuel cell system 10 shown in FIG. 1, an outlet of a fuel cell 16 for a heat exchange medium is connected to an inlet or a reactor vessel (A) 12a for the heat exchange medium through a liquid pipe 42a. A three-way valve 44a is installed in the middle of the liquid pipe 42a. An outlet of the reactor vessel (A) 12a for the heat exchange medium is connected to an inlet of the fuel cell 16 for the heat exchange medium through a liquid pipe 42b. A three-way valve 44b is installed in the middle of the liquid pipe 42b.

A liquid pipe 42c is connected to the other gate of the three-way valve 44a connected to the liquid pipe 42a. The outlet of the fuel cell 16 for the heat exchange medium is connected to an inlet of a reactor vessel (B) 12b for the heat exchange medium through the liquid pipe 42a, the three-way valve 44a, and the liquid pipe 42c.

An outlet of the reactor vessel (B) 12b for the heat exchange medium is connected to the inlet of the fuel cell 16 for the heat exchange medium through a liquid pipe 42d and the liquid pipe 42b. A three-way valve 44c is connected in the middle of the liquid pipe 42d. Further, a terminal of the liquid pipe 42d is connected to the liquid pipe 42b located between, the three-way valve 44b and the fuel cell 16.

The other gate of the three-way valve 44b connected to the liquid pipe 42b is connected to an inlet of a boiler 20 for the heat exchange medium through a liquid pipe 42e. Further, the other gate of the three-way valve 44c connected to the liquid pipe 42d is connected to the liquid pipe 42e through a liquid pipe 42f.

An outlet of the boiler 20 for the heat exchange medium is connected to an inlet of a cooling device 18 for the heat exchange medium through a liquid pipe 42g. An outlet of the cooling device 18 for the heat exchange medium is connected to a first gate of a three-way valve 44d through a liquid pipe 42h. A second gate of the three-way valve 44d is connected to the liquid pipe 42a a located between the three-way valve 44a and the reactor vessel (A) 12a through a liquid pipe 42i. Further, a third gate of the three-way valve 44d is connected to the liquid pipe 42c through a liquid pipe 42j.

Further, an outlet of the fuel cell 16 for produced water is connected to an inlet of the boiler 20 for the produced water through a produced water exhaust pipe 46.

For example, when the three-way valve 44a is switched to the side of the reactor vessel (A) 12a and the three-way valve 44b is switched to the side of the fuel cell 16, the heat exchange medium can circulate in the order of the fuel cell 16, the liquid pipe 42a, the reactor vessel (A) 12a, the liquid pipe 42b, and then the fuel cell 16. On this occasion, the liquid pipes 42a and 42b constitute the circulation route (B).

Alternatively, when the three-way valve 44a is switched to the side of the reactor vessel (B) 12b and the three-way valve 44c is switched to the side of the fuel cell 16, the heat exchange medium can circulate in the order of the fuel cell 16, the liquid pipe 42a, the three-way valve 44a, the liquid pipe 42c, the reactor vessel (B) 12b, the liquid pipe 42d, the liquid pipe 42b, and then the fuel cell 16. On this occasion, the liquid pipes 42a to 42d constitute the circulation route (B).

Further, when the three-way valve 44d is switched to the side of the reactor vessel (B) 12b and the three-way valve 44c is switched to the side of the cooling device 18, the heat exchange medium can circulate in the order of the cooling device 18, the reactor vessel (B) 12b, the boiler 20, and then the cooling device 18. On this occasion, the liquid pipes connecting them constitute the circulation route (A).

Alternatively, when the three-way valves 44d and 44a are switched to the side or the reactor vessel (A) 12a and the three-way valve 44b is switched to the side of the cooling device 18, the heat exchange medium can circulate in the order or the cooling device 18, the reactor vessel (A) 12a, the boiler 20, and then the cooling device 18. On this occasion, the liquid pipes connecting them constitute the circulation route (A).

Further, when the three-way valve 44a is switched to the side of the reactor vessel (A) 12a, the three-way valve 44b is switched to the side of the cooling device 18, the three-way valve 44d to is switched to the side of the reactor vessel (B) 12b, and the three-way valve 44c is switched to the side of the fuel cell 16, the heat exchange medium can circulate in the order of the fuel cell 16, the reactor vessel (A) 12a, the boiler 20, the cooling device 18, the reactor vessel (B) 12b, and then the fuel cell 16. On this occasion, the liquid pipes connecting them constitute the circulation route (C).

[1.8. Temperature Measurement Unit]

A fuel cell system 10 may further include a temperature measurement unit (not shown in the figure) to measure the temperatures of reactor vessels 12 and a fuel cell 16. The maximum quantity of hydrogen stored in the reactor vessels 12 is determined by the composition and the quantity of a contained hydrogen storage material. As a result, when a load connected to a fuel cell 16 is constant, the quantity of hydrogen remaining in the reactor vessels 12 (namely the timing of switching supply routes and circulation routes) can be estimated by a method other than temperature measurement (for example, the operating time of a fuel cell 16). Consequently, a temperature measurement unit is not absolutely necessary.

When a load varies in contrast, the quantity of hydrogen remaining in reactor vessels 12 is hardly estimated only by using the operating time of a fuel cell 16. On such an occasion, preferably the temperatures of the reactor vessels 12 and the fuel cell 16 are measured by using a temperature measurement unit and the supply routes of a hydrogen gas and the circulation routes of a heat exchange medium are switched on the basis of the measured temperatures (judgment unit).

The measured temperatures are concretely used for (a) judging whether a hydrogen gas is supplied from a hydrogen tank 14 to a fuel cell 16 or the hydrogen gas is supplied from reactor vessels 12 to the fuel cell 16, (b) judging the quantity of storing hydrogen or the quantity of remaining hydrogen in reactor vessels 12, or the like.

For example, when the temperature of a fuel cell 16 is lower than the minimum equilibrium temperature ($T_L$) of a hydrogen storage material, hydrogen cannot be desorbed from the hydrogen storage material only by using the exhaust heat of the fuel cell 16. On such an occasion, preferably a hydrogen gas is supplied from a hydrogen tank 14 to a fuel cell 16 through a supply route (C).

Further, when hydrogen starts to be absorbed into a hydrogen storage material, the temperature of the hydrogen storage material rises gradually. When the hydrogen storage material comes close to a fully-filled state, the absorption heat reduces gradually and the temperature rise slows gradually.

When hydrogen starts to be desorbed from a hydrogen storage material in contrast, the hydrogen storage material absorbs the heat dissipated from a fuel cell 16 and hence the temperature rise of the hydrogen storage material is mild. When the quantity of hydrogen remaining in the hydrogen storage material reduces, the quantity of dissipation heat absorbed in the hydrogen storage material reduces gradually and the temperature of the hydrogen storage material rises gradually.

Consequently, by measuring the temperature variation in reactor vessels 12, it is possible to estimate the quantities of storing hydrogen and remaining hydrogen, namely the timing of switching supply routes and circulation routes.

[1.9. Control Mechanism]

A control mechanism switches the supply routes of a hydrogen gas and the circulation routes of a heat exchange medium. In general, the switching of the supply routes and the circulation routes is controlled by using control parameters including a hydrogen quantity in a hydrogen tank 14, hydrogen quantities in reactor vessels 12, the temperatures of the reactor vessels 12 and a fuel cell 16, an operating time of the fuel cell 16, and others. A method of switching the supply routes and the circulation routes using the control mechanism is not particularly limited and an appropriate method can be used depending on the purpose. Concretely, a control mechanism includes the following unit.

[1.9.1. Judgment Unit]

When a fuel cell system 10 has such a temperature measurement unit as stated above, preferably a control mechanism has a judgment unit of switching the supply routes of a hydrogen gas and the circulation routes of a heat exchange medium on the basis of measured temperatures. The details of the judgment unit are described above and hence the explanations are omitted.

[1.9.2. Switching Unit (A)]

A control mechanism may include a switching unit (A). A "switching unit (A)" is defined as a unit of switching the supply routes of a hydrogen gas and the circulation routes of a heat exchange medium so that a hydrogen desorption process of circulating the heat exchange medium between a fuel cell 16 and a reactor vessel (A) 12*a* and supplying the hydrogen gas from the reactor vessel (A) 12*a* to the fuel cell 16, and a hydrogen absorption process of supplying the hydrogen gas from a hydrogen tank 14 to a reactor vessel (B) 12*b* (B is different from A) and circulating the heat exchange medium between the reactor vessel (B) 12*b* and a cooling device 18 may be carried out simultaneously or individually.

When a fuel cell system 10 has two reactor vessels 12, one of the reactor vessels 12 can always be in a fully-filled state by simultaneously desorbing hydrogen in a reactor vessel (A) 12*a* and absorbing hydrogen in a reactor vessel (B) 12*b*.

Meanwhile, when a fuel cell system 10 has three or more reactor vessels 12, it is not always necessary to simultaneously desorb hydrogen in a reactor vessel (A) 12*a* and absorb hydrogen in a reactor vessel (B) 12*b* as long as at least one of the reactor vessels 12 is in a fully-filled state.

[1.9.3. Switching Unit (B)]

A control mechanism may include a switching unit (B). A "switching unit (B)" is defined as a unit of alternately repeating a process of simultaneously carrying out a set of hydrogen desorption from a reactor vessel (A) 12*a* and heat exchange between a fuel cell 16 and the reactor vessel (A) 12*a*, and a set of hydrogen absorption to a reactor vessel (B) 12*b* (B is different from A) and heat exchange between the reactor vessel (B) 12*b* and a cooling device 18, and a process of simultaneously carrying out a set of hydrogen desorption from the reactor vessel (B) 12*b* and heat exchange between the fuel cell 16 and the reactor vessel (B) 12*b*, and a set of hydrogen absorption to the reactor vessel (A) 12*a* and heat exchange between the reactor vessel (A) 12*a* and the cooling device 18.

When a fuel cell system 10 includes two reactor vessels 12, one of the reactor vessels 12 can always keep a fully-filled state until the hydrogen in a hydrogen tank 14 is depleted by switching a reactor vessel (A) 12*a* and a reactor vessel (B) 12*b* alternately and absorbing and desorbing hydrogen.

[1.9.4. Switching unit (C)]

Further, a control mechanism may include a switching unit (C). A "switching unit (C)" is defined as a unit of switching the supply routes of a hydrogen gas and the circulation routes of a heat exchange medium so that a process of circulating the heat exchange medium between a fuel cell 16 and a reactor vessel (C) and supplying the hydrogen gas from the reactor vessel (C) to the fuel cell 16, and a process of supplying the hydrogen gas from a hydrogen tank 14 to the reactor vessel (C) and circulating the heat exchange medium between the reactor vessel (C) and a cooling device 18 may be repeated alternately.

For example, when a load connected to a fuel cell 16 requires an intermittent output, hydrogen desorption and hydrogen absorption can be repeated alternately only by using a reactor vessel (C).

[2. Operating Method of Fuel Cell System]

Concrete examples of an operating method of a fuel cell system 10 including two reactor vessels 12 are explained, hereunder. Here, in the following explanations, a reactor vessel (A) 12*a* and a reactor vessel (B) 12*b* are regarded as filled with an identical hydrogen storage material, and the minimum equilibrium temperature ($T_L$) and the maximum equilibrium temperature ($T_H$) of the hydrogen storage material are set at 30° C. and 183° C. respectively. On this occasion, a hydrogen desorption equilibrium temperature is 33° C. at 0.12 MPa and a hydrogen absorption equilibrium temperature is if 150° C. at 5 MPa.

A maximum pressure in the interior of a hydrogen tank 14 is set at 70 MPa and a hydrogen release pressure can be set at an arbitrary value by a prepared pressure regulation valve. The maximum exhaust heat temperature ($T_{max}$) of a fuel cell 16 is set at 80° C. Further, a radiator is used as a cooling device 18 and the ambient temperature for heat exchange is set at 35°C.

[2.1. Hydrogen Absorption into Reactor Vessel (A) and Hydrogen Desorption from Reactor Vessel (B)]

Figure 2:
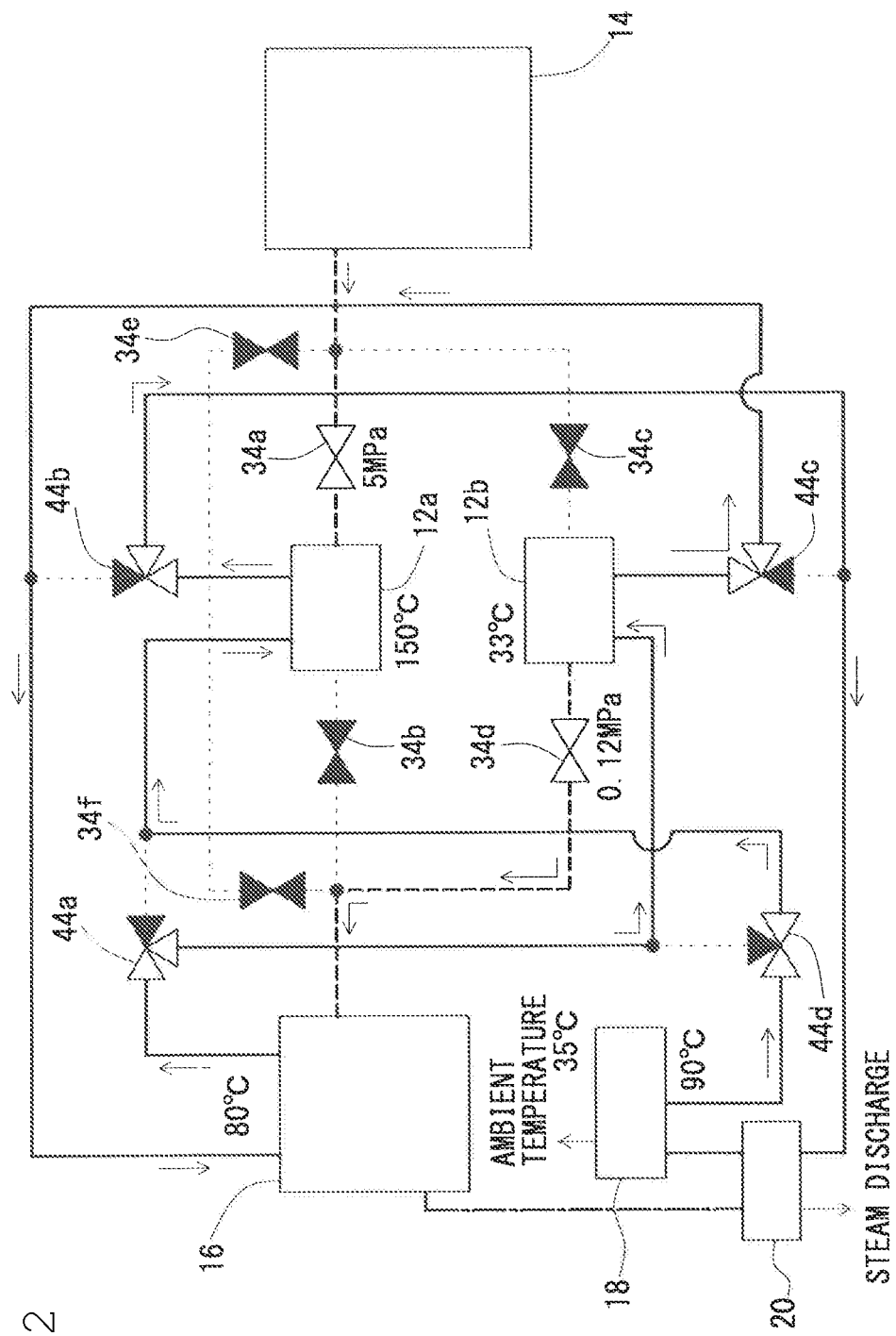
FIG. 2 is a schematic diagram of the supply routes of a hydrogen gas and the circulation routes of a heat exchange medium when hydrogen is absorbed in a reactor vessel (A) and desorbed in a reactor vessel (B).

FIG. 2 shows a schematic diagram of the supply routes of a hydrogen gas and the circulation routes of a heat exchange medium when hydrogen is absorbed in a reactor vessel (A) 12*a* and desorbed in a reactor vessel (B) 12*b*. In FIG. 2, the blacked-out parts of on-off valves 34*a* to 34*f* and three-way valves 44*a* to 44*d* represent that the parts are closed.

When hydrogen (hydrogen pressure: 5 MPa) is supplied from, a hydrogen tank 14 to a reactor vessel (A) 12*a*, a hydrogen storage material in the reactor vessel (A) 12*a* generates heat by hydrogen adsorption reaction (150° C.). At this time, when three-way valves 44*a* to 44*d* are switched as shown in FIG. 2, the reactor vessel (A) 12*a* can be connected to a heat exchange line communicating with a cooling device 18.

When a heat exchange medium of a high temperature discharged from the reactor vessel (A) 12*a* enters a boiler 20, produced water stored in the boiler 20 is heated and draws the boiling latent heat from the heat exchange medium and thus the heat exchange medium is cooled. Some of the produced water becomes steam and is discharged from the boiler 20 to the outside.

Successively, the heat exchange medium is cooled, further by exchanging heat with the outside (35° C.) in the cooling device 18. The cooled heat exchange medium (90° C.) is returned again to the reactor vessel (A) 12*a*. By this loop, the high temperature exhaust heat exceeding an exhaust heat temperature (80° C.) of a fuel cell 16 can go through the cooling device 18 and the heat-exchange capability of the cooling device 18 improves. As a result, the cooling device 18 can be downsized.

Meanwhile, when hydrogen (hydrogen pressure: 0.12 MPa) is desorbed from a reactor vessel (B) 12*b* to the fuel cell 16, the hydrogen storage material in the reactor vessel (B) 12*b* absorbs heat by hydrogen desorption reaction (33° C.). At this time, when the three-way valves 44*a* to 44*d* are switched as shown in FIG. 2, the reactor vessel (B) 12*b* is connected to the heat exchange line communicating with the fuel cell 16, and the fuel cell 16 (maximum exhaust heat temperature: 80° C.) can be cooled by the heat absorption of the reactor vessel (B) 12*b*.

[2.2. Hydrogen Desorption from Reactor Vessel (A) and Hydrogen Absorption into Reactor Vessel (B)]

Figure 3:
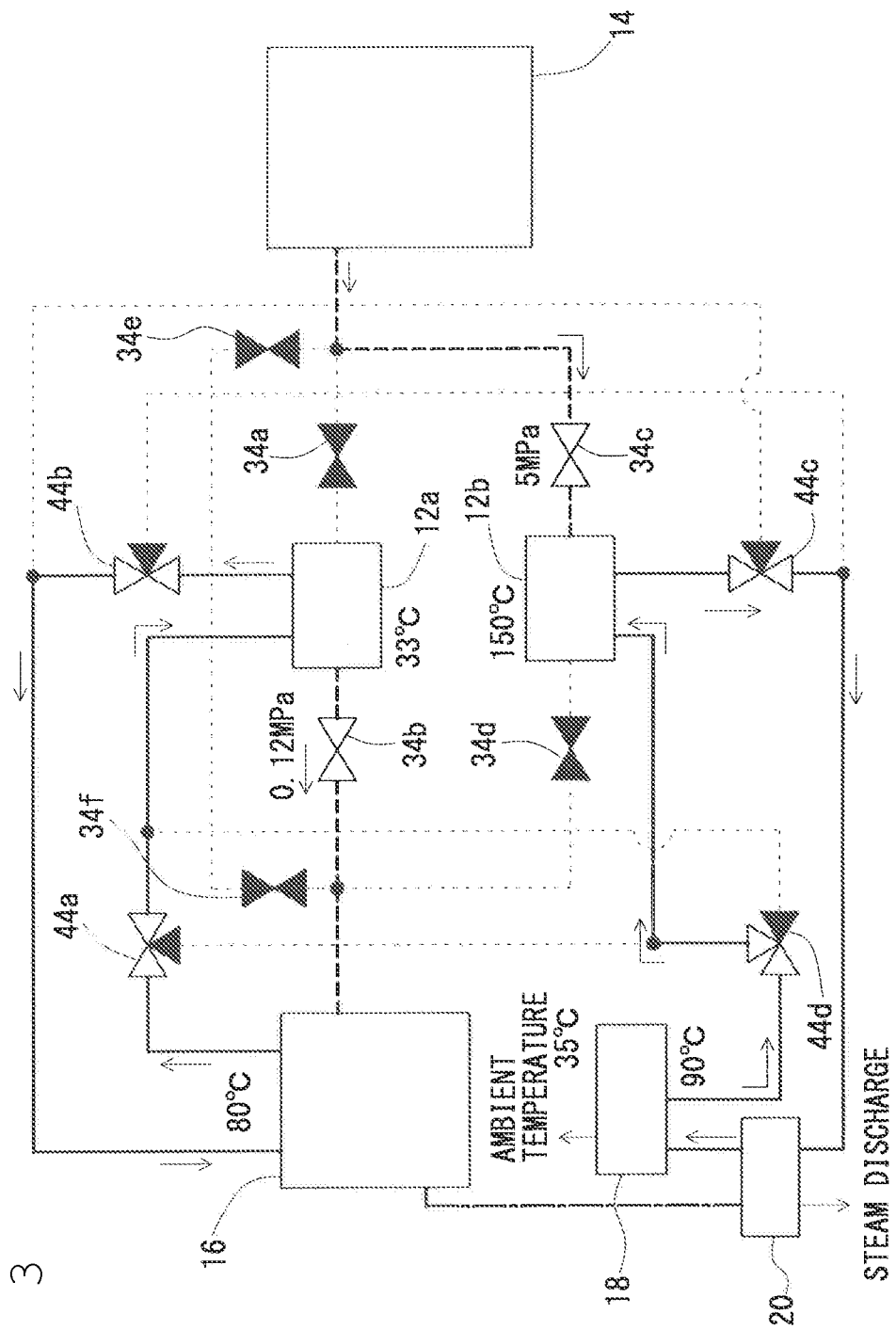
FIG. 3 is a schematic diagram of the supply routes of a hydrogen gas and the circulation routes of a heat exchange medium when hydrogen is desorbed in a reactor vessel (A) and absorbed in a reactor vessel (B).

FIG. 3 shows a schematic diagram of the supply routes of a hydrogen gas and the circulation routes of a heat exchange medium when hydrogen is desorbed in a reactor vessel (A) 12*a* and absorbed in a reactor vessel (B) 12*b*. In FIG. 3, the blacked-out parts of on-off valves 34*a* to 34*f* and three-way valves 44*a* to 44*d* represent that the parts are closed.

When on-off valves 34*a* to 34*f* and three-way valves 44*a* to 44*d* are controlled as shown in FIG. 3, inversely to FIG. 2, hydrogen can be desorbed in a reactor vessel (A) 12*a* and absorbed in a reactor vessel (B) 12*b*. Other points are similar to those of FIG. 2 and hence the explanations are omitted.

Further, by repeating the state of FIG. 2 and the state of FIG. 3 alternately, a fuel cell 16 can be cooled continuously through heat exchange with the reactor vessel (A) 12*a* and the reactor vessel (B) 12*b*.

[2.3. Hydrogen Supply from Hydrogen Tank to Fuel Cell (1)]

Figure 4:
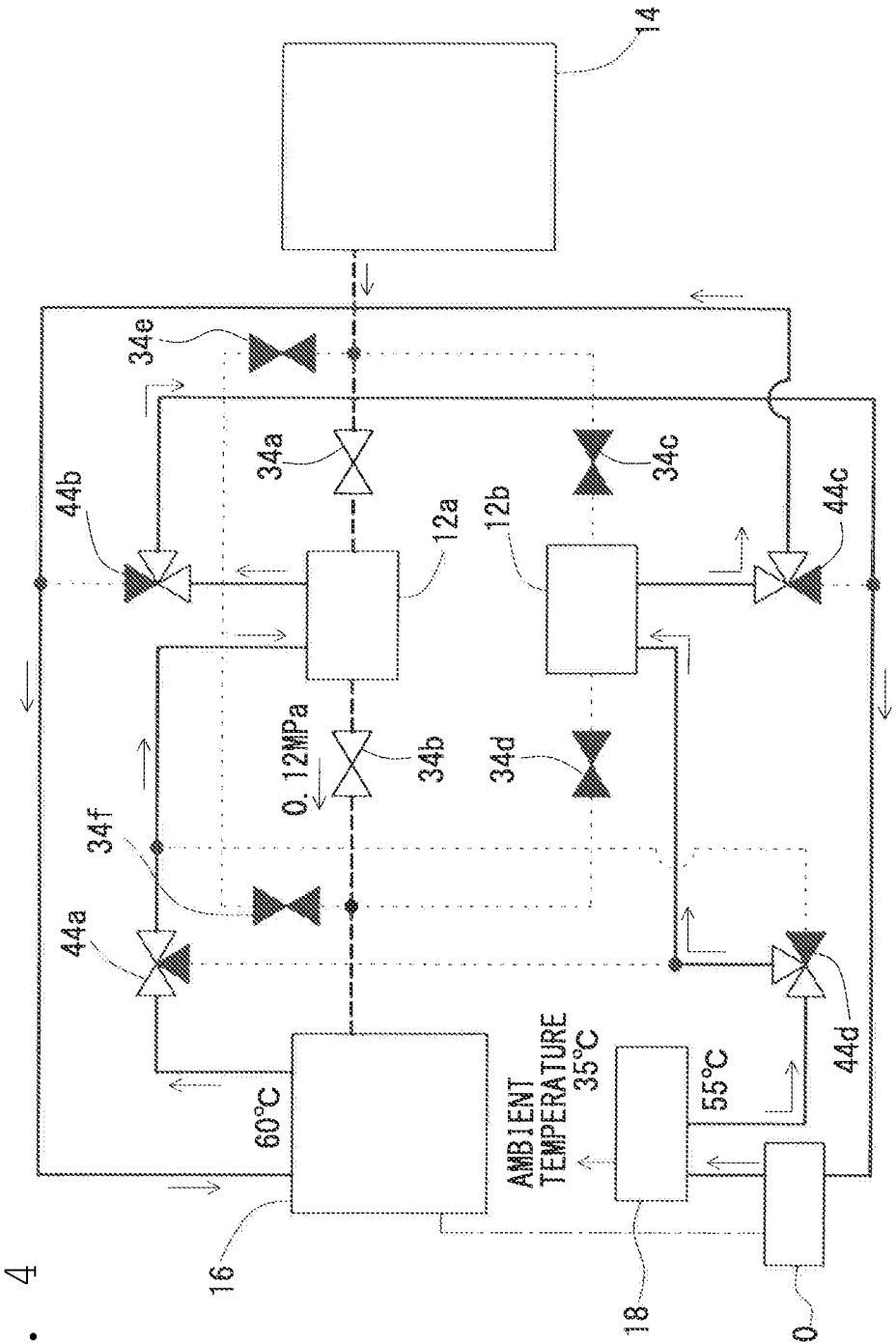
FIG. 4 is a schematic diagram of the supply routes of a hydrogen gas and the circulation routes of a heat exchange medium when the hydrogen gas is supplied from a hydrogen tank to a fuel cell through a reactor vessel.

FIG. 4 shows a schematic diagram of the supply routes of a hydrogen gas and the circulation routes of a heat exchange medium when the hydrogen gas is supplied from a hydrogen tank 14 to a fuel cell 16 through a reactor vessel (A) 12*a*. In FIG. 4, the blacked-out parts of on-off valves 34*a* to 34*f* and three-way valves 44*a* to 44*d* represent that the parts are closed.

When a reactor vessel (A) 12*a* is in a fully-filled state, on-off valves 34*a* and 34*b* are opened simultaneously and hydrogen (hydrogen pressure: 0.12 MPa) is supplied from a hydrogen tank 14 to a fuel cell 16 through the reactor vessel 12*a*. On this occasion, hydrogen absorption reaction does not occur in the reactor vessel (A) 12*a* and hence the reactor vessel. (A) 12*a* does not generate heat.

Further, when three-way valves 44*a* to 44*d* are switched as shown in FIG. 4, a heat exchange medium can be circulated along the loop of the fuel cell 16, the reactor vessel (A) 12*a*, a boiler 20, a cooling device 18, a reactor vessel (B) 12*b*, and then the fuel cell 16.

FIG. 4 is an example of a fuel cell 16 being in a low load (small generated heat quantity) state. The minimum equilibrium temperature ($T_L$) of a hydrogen storage material is 30° C. Consequently, when the actual temperature of the fuel cell 16 is 60° C. (<$T_{max}$), a reactor vessel (A) 12*a* is heated by circulating a heat exchange medium as shown in FIG. 4. Since the temperature of the reactor vessel (A) 12*a* never exceeds a maximum equilibrium temperature ($T_H$), however, the reactor vessel (A) 12*a* is never damaged.

Further, even in the case of using a small-sized radiator as a cooling device 18, when the fuel cell 16 is in a low load (small generated heat quantity) state, the heat of the fuel cell 16 can be dissipated. On this occasion, a heat exchange medium is cooled by the cooling device 18, the cooled heat exchange medium (55° C.) is transferred to a reactor vessel (B) 12*b*, and hence the reactor vessel (B) 12*b* is also never damaged.

[2.4. Hydrogen Supply from Hydrogen Tank to Fuel Cell (2)]

Figure 5:
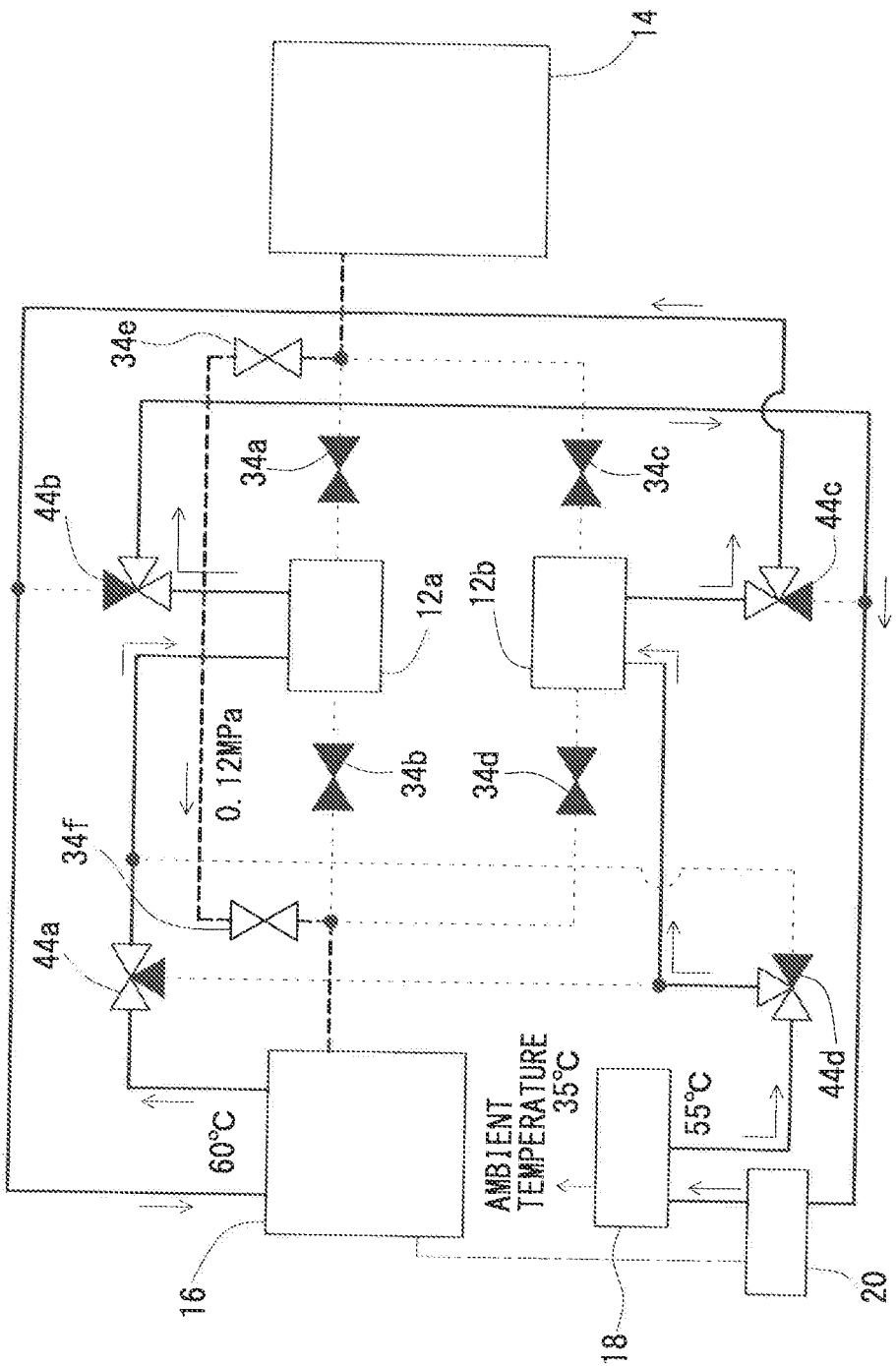
FIG. 5 is a schematic diagram of the supply routes of a hydrogen gas and the circulation routes of a heat exchange medium when the hydrogen gas is supplied from a hydrogen tank directly to a fuel cell.

FIG. 5 shows a schematic diagram of the supply routes of a hydrogen gas and the circulation routes of a heat exchange medium when the hydrogen gas is supplied directly from a hydrogen tank 14 to a fuel cell 16. In FIG. 5, the blacked-out parts of on-off valves 34*a* to 34*f* and three-way valves 44*a* to 44*d* represent that the parts are closed.

On-off valves 34*e* and 34*f* are opened simultaneously and a hydrogen gas is supplied directly from a hydrogen tank 14 to a fuel cell 16. On this occasion, since hydrogen does not flow in a reactor vessel (A) 12*a* and a reactor vessel (B) 12*b*, neither of them generates heat.

Further, when three-way valves 44*a* to 44*d* are controlled as shown in FIG. 5, a heat exchange medium can be circulated along the loop of the fuel cell 16, the reactor vessel (A) 12*a*, a boiler 20, a cooling device 18, the reactor vessel (B) 12*b*, and then the fuel cell 16. A heat exchange line in FIG. 5 is similar to the one in FIG. 4 and hence detailed explanations are omitted.

[3. Effect]

A fuel cell system 10 according to the present invention includes both a hydrogen tank 14 storing a hydrogen gas and a plurality of reactor vessels 12 containing a hydrogen storage material, which act as fuel sources. Consequently, at the time of start-up, the temperature of the fuel cell 16 can be raised rapidly to an appropriate temperature by supplying hydrogen from the hydrogen tank 14 to the fuel cell 16.

Further, when the temperature of a fuel cell 16 rises to a predetermined temperature, at least a reactor vessel (A) 12*a* can be heated by using the exhaust heat from the fuel cell 16 and hydrogen can be desorbed from the reactor vessel (A) 12*a*. The hydrogen desorbed from the reactor vessel (A) 12*a* can be used directly as a fuel of the fuel cell 16.

At the same time, when at least another reactor vessel (B) 12*b* is thermally connected to a cooling device 18 and a hydrogen gas is supplied to the interior of the reactor vessel (B) 12*b*, the hydrogen can be absorbed in a hydrogen storage material in the interior of the reactor vessel (B) 12*b* and simultaneously the adsorption heat can be dissipated to the outside by using the cooling device 18.

Consequently, it is unnecessary to use a large-sized cooling device in order to maintain the temperature of a fuel cell 16 at an appropriate temperature. Further, when a set of hydrogen desorption in a reactor vessel (A) 12*a* and hydrogen absorption in a reactor vessel (B) 12*b* and a set of hydrogen absorption in tire reactor vessel (A) 12*a* and hydrogen desorption in the reactor vessel (B) 12*b* are repeated alternately, it is possible to absorb and desorb hydrogen reversibly without using another heat source and another cooling source.

Although embodiments according to the present invention have heretofore been explained in detail, the present invention is not limited to the above embodiments at all and can be modified variously in the range not departing from the tenor of the present invention.

A fuel cell system according to the present invention can be used for a stationary type power generation system, an energy source in a movable body, and the like.

What is claimed is:

1. A fuel cell system, comprising:
   a plurality of reactor vessels containing a hydrogen storage material;
   a hydrogen tank storing a hydrogen gas;
   a fuel cell;
   a cooling device to dissipate exhaust heat from the reactor vessels or the fuel cell to outside;
   a hydrogen gas line that can switch supply routes of the hydrogen gas among the reactor vessels, the hydrogen tank, and the fuel cell;
   a heat exchange line that can switch circulation routes of a heat exchange medium among the reactor vessels, the fuel cell, and the cooling device; and
   a control mechanism to switch the supply routes of the hydrogen gas and the circulation routes of the heat exchange medium,
   wherein the hydrogen gas line includes:
      a supply route (A) to supply the hydrogen gas from the hydrogen tank to at least one of the reactor vessels;
      a supply route (B) to supply the hydrogen gas from at least one of the reactor vessels to the fuel cell; and
      a supply route (C) to supply the hydrogen gas from the hydrogen tank to the fuel cell, supply route (C) being formed from one or more pipes or valves directly connecting the hydrogen tank to the fuel cell, and
   the heat exchange line includes:
      a circulation route (A) to directly circulate the heat exchange medium between at least one of the reactor vessels and the cooling device;

a circulation route (B) to circulate the heat exchange medium between at least one of the reactor vessels and the fuel cell, circulation route (B) being formed by one or more pipes or valves that directly connect the reactor vessels and the fuel cell; and a circulation route (C) to circulate the heat exchange medium between the fuel cell and the cooling device.

2. The fuel cell system according to claim 1, wherein the fuel cell system further comprises a temperature measurement unit to measure temperatures of the reactor vessels and the fuel cell, and the control mechanism includes a judgment unit to switch the supply routes of the hydrogen gas and the circulation routes of the heat exchange medium on the basis of the temperatures measured by the temperature measurement unit.

3. The fuel cell system according to claim 1, wherein the control mechanism includes a switching unit (A), and the switching unit (A) is a unit of switching the supply routes of the hydrogen gas and the circulation routes of the heat exchange medium so that a hydrogen desorption process of circulating the heat exchange medium between the fuel cell and a reactor vessel (A) and supplying the hydrogen gas from the reactor vessel (A) to the fuel cell, and a hydrogen absorption process of supplying the hydrogen gas from the hydrogen tank to a reactor vessel (B) (B is different from A) and circulating the heat exchange medium between the reactor vessel (B) and the cooling device may be carried out simultaneously or individually.

4. The fuel cell system according to claim 1, wherein the control mechanism includes a switching unit (B), and the switching unit (B) is a unit of alternately repeating:
a process of simultaneously carrying out a set of hydrogen desorption from a reactor vessel (A) and heat exchange between the fuel cell and the reactor vessel (A), and a set of hydrogen absorption to a reactor vessel (B) (B is different from A) and heat exchange between the reactor vessel (B) and the cooling device; and a process of simultaneously carrying out a set of hydrogen desorption from the reactor vessel (B) and heat exchange between the fuel cell and the reactor vessel (B), and a set of hydrogen absorption to the reactor vessel (A) and heat exchange between the reactor vessel (A) and the cooling device.

5. The fuel cell system according to claim 1, wherein the control mechanism includes a switching unit (C), and the switching unit (C) is a unit of switching the supply routes of the hydrogen gas and the circulation routes of the heat exchange medium so that a process of circulating the heat exchange medium between the fuel cell and a reactor vessel (C) and supplying the hydrogen gas from the reactor vessel (C) to the fuel cell, and a process of supplying the hydrogen gas from the hydrogen tank to the reactor vessel (C) and circulating the heat exchange medium between the reactor vessel (C) and the cooling device may be repeated alternately.

6. The fuel cell system according to claim 1, wherein the fuel cell system further comprises a boiler to store water produced in the fuel cell and boil the produced water by exchanging heat with the heat exchange medium, and the boiler is connected to the circulation route (A).

7. The fuel cell system according to claim 1, wherein the hydrogen storage material includes a material having an equilibrium temperature when a hydrogen pressure is 0.1 MPa not higher than a maximum exhaust heat temperature of the fuel cell.

8. The fuel cell system according to claim 1, wherein the hydrogen storage material includes a material having an equilibrium temperature when a hydrogen pressure is 10 MPa higher than a maximum exhaust heat temperature of the fuel cell.

* * * * *